United States Patent
Lobaza et al.

(10) Patent No.: US 6,812,832 B2
(45) Date of Patent: Nov. 2, 2004

(54) VEHICLE COMMUNICATION SYSTEM WITH INTEGRATED PRE-IMPACT SENSING

(75) Inventors: Anthony Gerard Lobaza, Bloomfield Hills, MI (US); Allan J. Hoffman, Berkley, MI (US); Osman D. Altan, Northville, MI (US)

(73) Assignee: General Motors Corporation, Detroit, MI (US)

( * ) Notice: Subject to any disclaimer, the term of this patent is extended or adjusted under 35 U.S.C. 154(b) by 150 days.

(21) Appl. No.: 10/305,382

(22) Filed: Nov. 26, 2002

(65) Prior Publication Data

US 2004/0100368 A1 May 27, 2004

(51) Int. Cl.[7] .............................................. B06Q 1/00
(52) U.S. Cl. .................................. 340/436; 340/539.18
(58) Field of Search ........................... 340/436, 539.18, 340/425.5, 435, 825.36, 825.49; 701/45, 30, 29; 280/735, 734; 455/404.1, 567

(56) References Cited

U.S. PATENT DOCUMENTS

| | | | | |
|---|---|---|---|---|
| 5,574,427 A | * | 11/1996 | Cavallaro | 340/436 |
| 5,969,598 A | * | 10/1999 | Kimura | 340/436 |
| 6,128,482 A | | 10/2000 | Nixon et al. | 455/414 |
| 6,211,777 B1 | | 4/2001 | Greenwood et al. | 340/436 |
| 6,405,132 B1 | | 6/2002 | Breed et al. | 701/301 |
| 6,741,168 B2 | * | 5/2004 | Webb et al. | 340/436 |

OTHER PUBLICATIONS

U.S. patent application Publication, 2002/0103622, published Aug. 1, 2002.
U.S. patent application Publication, 2002/0137489, published Sep. 26, 2002.
"GM OnStar to Detect More Wrecks," David Kiley, USA Today.

* cited by examiner

*Primary Examiner*—Anh V. La
(74) *Attorney, Agent, or Firm*—Kathryn A. Marra

(57) ABSTRACT

An integrated vehicle communication system for a vehicle includes a telecommunication apparatus in communication with a vehicle data bus. A pre-impact system in also communication with the vehicle data bus, the pre-impact system further providing the telecommunication apparatus with a signal reflective of a determined imminent impact detected thereby. Upon receiving the signal reflective of the determined imminent impact, the telecommunication apparatus initiates a notification to a service provider if the telecommunication apparatus is not in communication with an impact detection system controller in the vehicle.

20 Claims, 4 Drawing Sheets

VEHICLE COMMUNICATION SYSTEM WITH INTEGRATED PRE-IMPACT SENSING

BACKGROUND

The present disclosure relates generally to vehicle communication systems and, more particularly, to a vehicle communication system having integrated pre-impact sensing.

A mobile application service provider (such as OnStar® by General Motors, for example) provides information and services to the vehicles of subscribers from a service center through a vehicle-installed wireless telecommunication apparatus. One type of service provided, in response to a request from a subscriber, is the selection of a specific point of interest from a stored database and the communication to the vehicle of data associated with the specific point of interest in the database. This associated data typically includes identification (name), location data (address) and dialable telephone number. For example, a traveling subscriber may call from an equipped vehicle and request a location for one or more nearby restaurants/hotels based upon the individual taste of the subscriber.

If the call is from the equipped vehicle, the mobile application service center silently obtains GPS or other vehicle position data from the vehicle via the telecommunication apparatus. An advisor receives the subscriber's request, consults a stored database for the nearest points of interest meeting the subscriber's criteria, and suggests possible points of interest to the subscriber. If a choice is received from the subscriber choice, the advisor verbally provides identification and location information to the subscriber and, if authorized, places a call to the selected point of interest with the dialable telephone number. The advisor may also provide the telephone number verbally to the subscriber, so that the subscriber may call the point of interest directly via the vehicle wireless telecommunication apparatus at a later time.

Still another feature of some mobile application service providers (such as OnStar®) is automatic collision notification (ACN), wherein, if an engagement of the vehicle's impact detection system (e.g., an airbag system) has occurred, the vehicle's impact detection system controller transmits a message to the mobile application system in the vehicle. In turn, the mobile application system automatically places a call to the service center so that the advisor may take an appropriate action. However, during certain types of vehicle impacts, it is possible that the vehicle's communication data bus could be severed, thereby interrupting communication between the impact detection's engagement controller and the mobile application system. As a result, the service center would be unaware that an impact had occurred and would therefore not initiate any appropriate action in response thereto.

SUMMARY

In an exemplary embodiment, an integrated vehicle communication system for a vehicle includes a telecommunication apparatus in communication with a vehicle data bus. A pre-impact system is also communication with the vehicle data bus, the pre-impact system further providing the telecommunication apparatus with a signal reflective of a determined imminent impact detected thereby. Upon receiving the signal reflective of the determined imminent impact, the telecommunication apparatus initiates a notification to a service provider if the telecommunication apparatus is not in communication with an impact detection system controller in the vehicle.

In another aspect, a vehicle communication network includes a wireless telecommunication network and a public switched telephone network accessible by the wireless telecommunication network. An integrated vehicle communication system configured within a vehicle further includes a telecommunication apparatus in communication with a vehicle data bus, and a pre-impact system in communication with the vehicle data bus. The pre-impact system further provides the telecommunication apparatus with a signal reflective of a determined imminent impact detected thereby. Upon receiving the signal reflective of the determined imminent impact, the telecommunication apparatus initiates a notification to a service provider connected to the public switched telephone network if the telecommunication apparatus is not in communication with an impact detection system controller in the vehicle.

In still another aspect, a method for communicating an impact event of vehicle includes receiving an indication of an imminent impact from a vehicle pre-impact detection system, and determining a communication status with an impact detection system controller within the vehicle. If it is determined that communication with the impact detection system controller is interrupted, then further initiating a communication to a service provider that an actual impact has occurred.

BRIEF DESCRIPTION OF THE DRAWINGS

Referring to the exemplary drawings wherein like elements are numbered alike in the several Figures.

DETAILED DESCRIPTION

Disclosed herein is a vehicle communication system having pre-impact sensing integrated therewith. Briefly stated, a telecommunication apparatus within the vehicle communication system is configured so as to receive a "pre-impact" signal from an impact warning system (also included within the vehicle) whenever an imminent impact is detected. The pre-impact signal is then used, in the event of a subsequent impact and/or interruption of data bus communications, to contact the service provider of the vehicle communication system. By using information from the impact warning system, the telecommunication apparatus is put on notice, prior to any actual impact, of a possible collision. Thus, this message will go through since the integrity of the data bus has not been compromised due to a possible collision. Subsequently, if there is a loss of communications between the telecommunication apparatus and the vehicle's impact detection engagement system, the telecommunication apparatus will assume that there has been an impact and initiate notification to the service provider.

Figure 1:
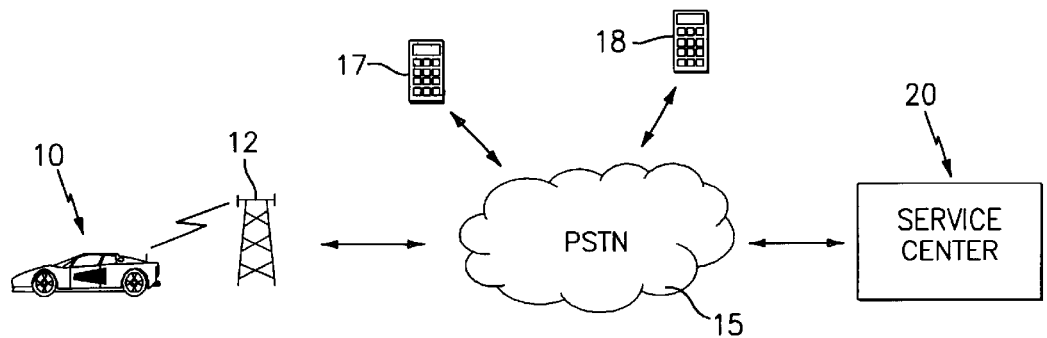
FIG. 1 is a schematic diagram of an exemplary mobile application services network through which vehicle communication services are provided to a vehicle, the vehicle communication service suitable for use in accordance with an embodiment of the invention.

Referring initially to FIG. 1, there is shown a vehicle 10 featuring a mobile telecommunication apparatus, suitable for use with an embodiment of the invention, and which may be installed in the vehicle or carried into the vehicle by the subscriber. The mobile telecommunication apparatus communicates through a wireless network 12, symbolized by a local telecommunication antenna tower, with a public switched telephone network (PSTN) 15, to which are also connected telephones 17 and 18. The mobile telecommunication apparatus in vehicle 10, which will be described in more detail with reference to FIG. 2, may include a cellular telephone registered with a cellular service provider or any other wireless apparatus, so long as it provides connection with, and operation through, PSTN 15 with general dialing capability.

The telecommunication apparatus carried in vehicle 10 is also preferably registered with a service provider such as, for example, OnStar®, which provides mobile application services to a subscriber through the apparatus in vehicle 10. The subscriber may be the owner or lessor of vehicle 10, particularly if at least part of the telecommunication apparatus is permanently installed in the vehicle. However, the term "subscriber" as used herein may also include a renter, operator or passenger in the vehicle using the services. The service provider generally maintains at least one service center 20, which is also connected to PSTN 15 and which the subscriber and other subscribers in other vehicles call for the mobile application services. The mobile application services may include, for example, requests for vehicle location, selection of specific points of interest and directions thereto, and emergency assistance (both requested and automatic), as well as others not named.

Figure 2:
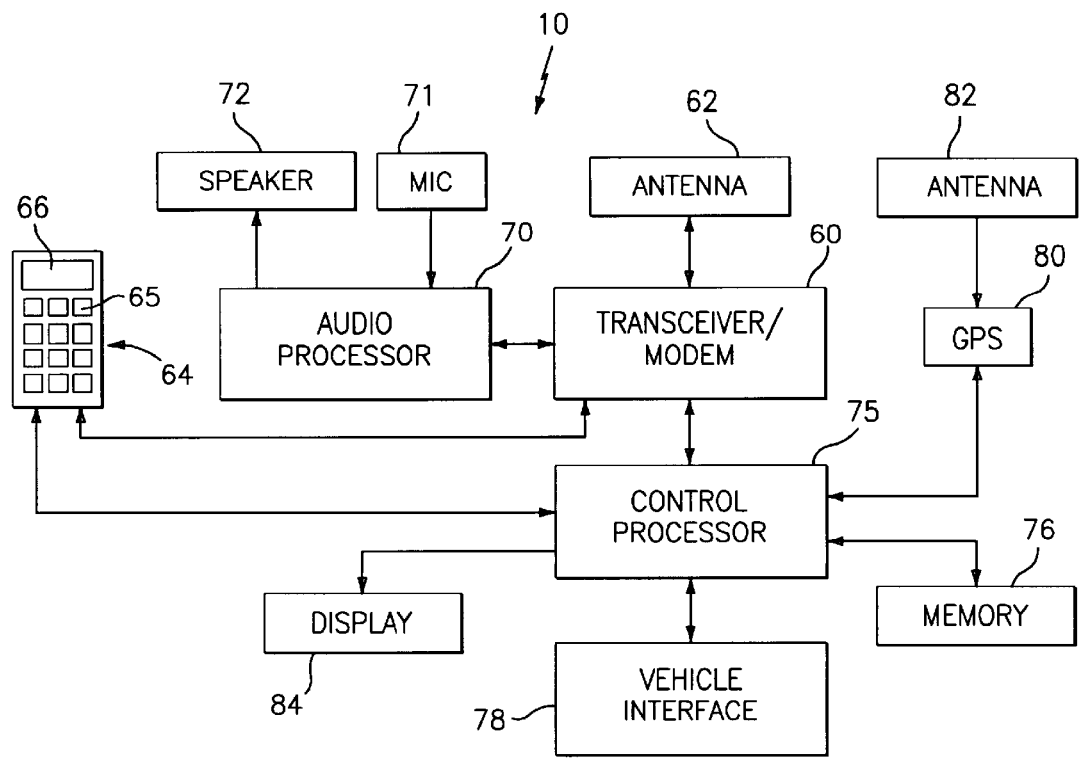
FIG. 2 is a block diagram illustrating the vehicle portion of a wireless vehicle communication apparatus used in the vehicle communication service of FIG. 1.

FIG. 2 is a block diagram of the wireless telecommunication apparatus in vehicle 10. A transceiver 60 communicates voice and data through wireless network 12 with public switched telephone network 15 through an antenna 62. In this embodiment, the transceiver 60 is provided with voice communication links to a handset 64 and, through an audio processor 70, to a microphone 71 and speaker 72 for "hands-free" operation. The transceiver 60 also includes a modem apparatus for data communication to and from the vehicle 10. A control processor 75, which may take the form of a programmed digital computer or a custom digital processor, has a data link to transceiver 60, both for control thereof and for communicating data therewith.

The control processor 75 is connected by a data link to a memory 76 and also controls and communicates with a GPS or similar navigation apparatus 80, which receives signals through a GPS antenna 82 from global positioning satellites and derives therefrom position data (e.g., the longitude and latitude and/or the speed and heading) of the apparatus. The GPS position data may, under control of control processor 75, be stored in memory 76 and provided therefrom to transceiver 60 for conversion into a transmissible form by the modem apparatus therein and subsequent transmission from vehicle 10 to service center 20.

In exemplary embodiment, the handset 64 contains an operator interface apparatus for transceiver 60, while a keypad 65 provides dialing capability and may include extra keys for special functions. It will be appreciated, however, that other key configurations (such as the current blue/red/white key set-up currently found in OnStar®) may be utilized. A display 66 allows information to be conveyed visually. The handset 64 also contains a memory for holding data to be displayed in display 66 and for storing one or more dialable telephone numbers for automated dialing. The memory is organized with a data structure associating particular data for display with a particular dialable telephone number. The handset 64 also includes apparatus for automated dialing of the held or stored dialable telephone numbers in response to a "send" key on keypad 65. In addition to the voice link to transceiver 60 (which is also capable of data transmission) a serial data link is provided with control processor 75, by which the latter may control certain functions of handset 64. A vehicle interface 78 may be provided to connect control processor 75 to other vehicle systems as required.

In addition, an audio processor 70 includes voice recognition and activation apparatus, which responds to predetermined spoken data via microphone 71 to perform predetermined functions. It accesses a plurality of voice models, which may be stored internally or in memory 76. Each voice model includes data permitting recognition of a spoken word or phrase. The audio processor 70 further includes apparatus both for comparing received spoken data with the voice models in order to recognize those words and phrases which are defined and for performing predetermined actions in response thereto. Some voice models represent commands, such as "menu," "store," "dial," "call," etc. Other voice models represent the digits required for telephone dialing: "one," "two," etc. Still other voice models represent predetermined locations or entities, such as OnStar®. As an example, the apparatus may be programmed to recognize the phrase "Call OnStar®" and respond by placing a call to the OnStar® service center. General dialing capability may be initiated by the word "Dial" followed by the number, digit by digit.

Figure 3:
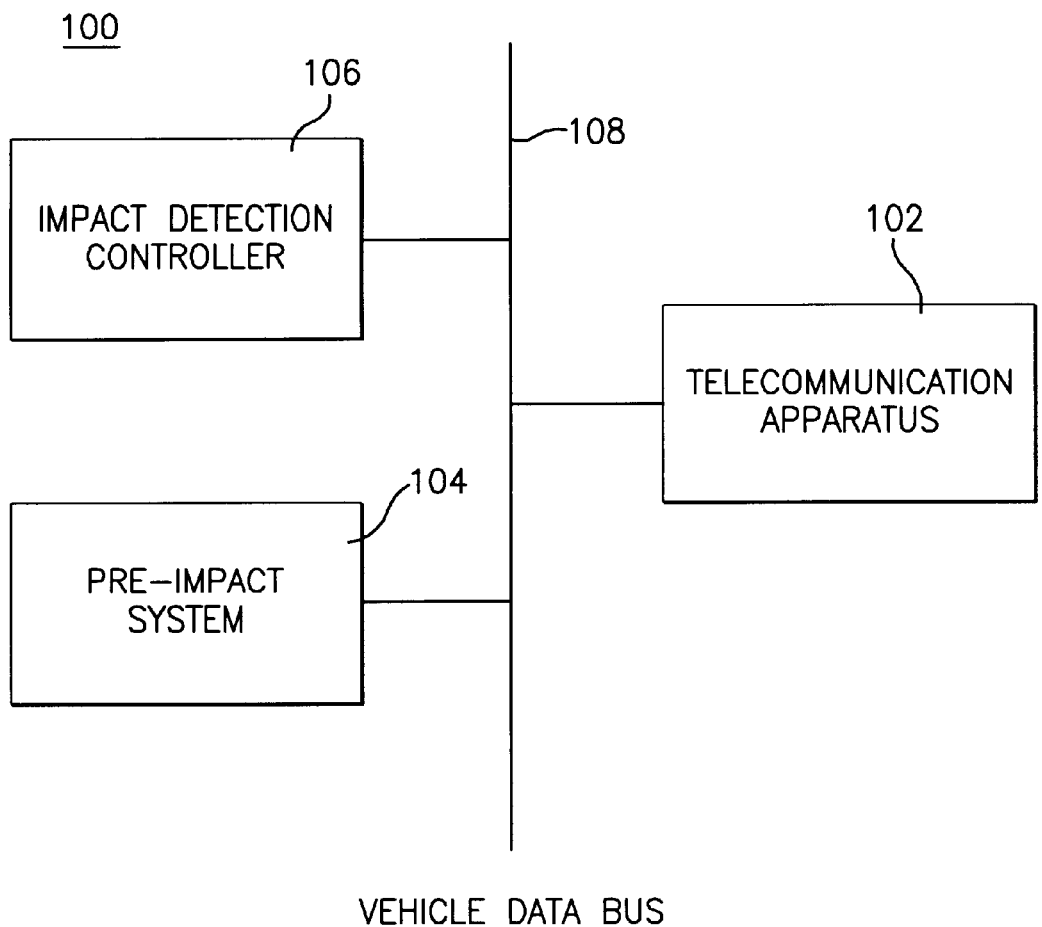
FIG. 3 is a block diagram illustrating the integration of vehicle communication system, an impact warning system, and the controller of a vehicle impact detection system, over a common data bus, in accordance with an embodiment of the invention.

Referring now to FIG. 3, there is shown a block diagram illustrating a vehicle communication system 100 illustrating the integration of a telecommunication apparatus 102, a pre-impact warning system 104 and the controller 106 of a vehicle impact detection system. As is shown, each system is in communication with the vehicle's data bus 108, which may be a Class 2 or CAN vehicle data bus or any other suitable bus known in the art for electronic data communication. Furthermore, the impact warning system 104 may also be chosen from existing object detection systems, forward collision warning (FCW) systems, etc., known to those skilled in the art. The impact warning system 104 may be shared by other subsystems in the vehicle such as stop-and-go, cut-in detection, automatic braking, parking aid, and the like, known to those skilled in the art.

Particularly, the vehicle is configured with a sensor (or sensors) capable of detecting objects in the frontal area of the vehicle. The sensor not only detects the presence of an object, but also provides some quantitative information about the object such as range, range rate, and azimuth position of the object. Additional information related to the object (e.g., a lead vehicle in many instances) may include relative acceleration, the size of the object, the dimensions of the object, the direction of movement of the object, position of potential impact, etc. The object information may be obtained by means of laser technology and/or radar technology, for example. In addition to the gathered object data, the pre-impact system 104 also incorporates a threat assessment algorithm, generally known in the art, which evaluates the incoming data both from the sensor and the vehicle, analyzes the particular situation, and then determines if there is any imminent threat of impacting an object in the frontal area of the vehicle.

With existing vehicle communication systems, and in the case of an impact that results in impact detection engagement, the impact detection system controller 106 transmits a message to the telecommunication apparatus 102 only after the air bag has actually been engaged. As a result of this communication, the vehicle communication system automatically makes a call to the service provider center to notify the center that there has been an impact, and the operator then takes appropriate action. As stated previously, during certain impacts, the data bus 108 could be severed, thereby interrupting communication between the impact detection system controller 106 and the telecommunication apparatus 102 prior to the telecommunication apparatus 102 receiving any information on the impact. This is due to the fact that the impact detection system controller 106, by itself, can only determine the incident after the impact itself, and because the impact detection engagement is sent after the impact. In addition, there are also a number of prioritized functions that the impact detection system controller 106 performs before the engagement message is actually distributed on the vehicle data bus 108.

Accordingly, by providing communication integration with the impact warning system 104, an appropriate signal generated therefrom (prior to any actual impact) may be used by the telecommunication apparatus 102 in the event of a loss of communication of the data bus 108.

Figure 4:
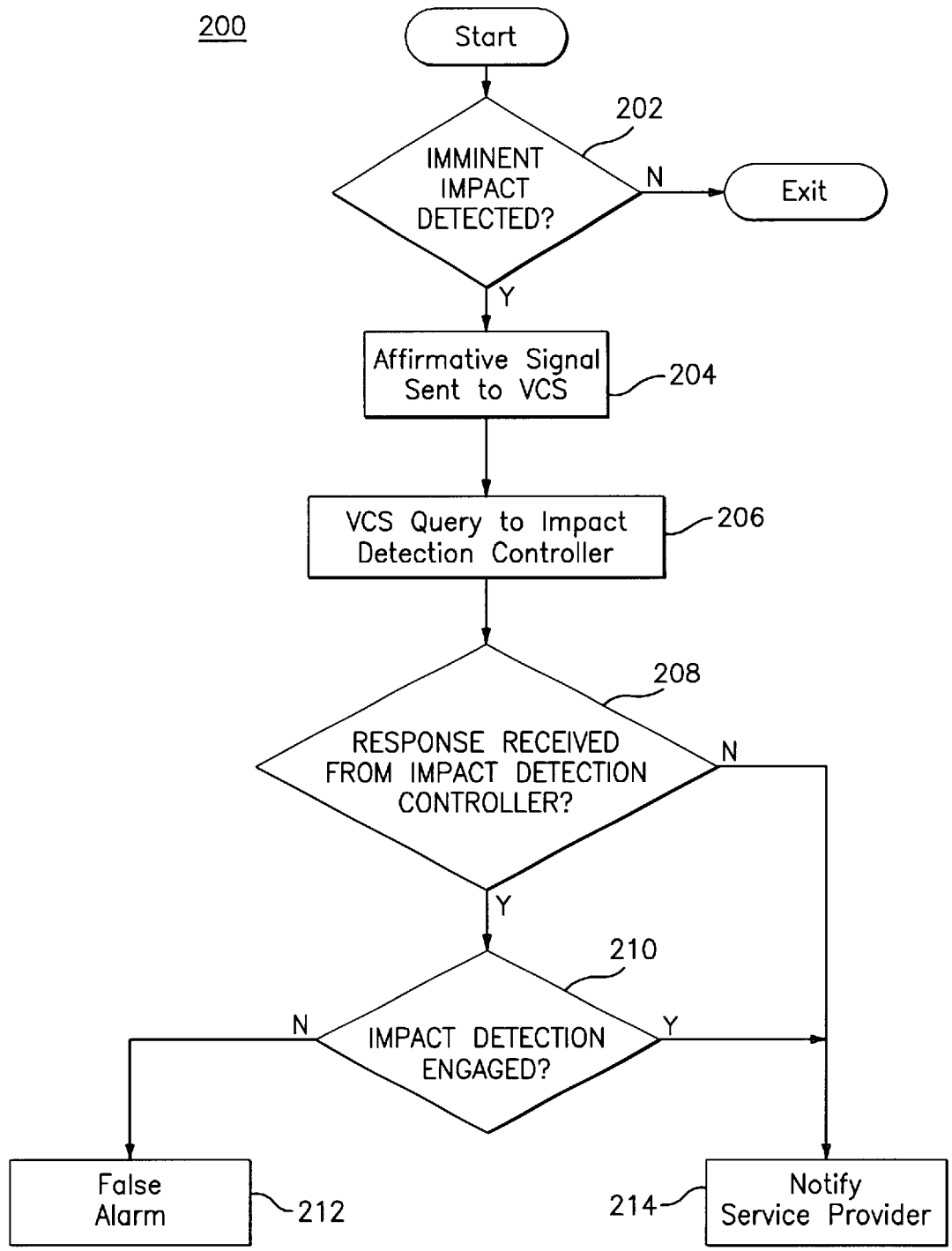
FIG. 4 is a flow diagram illustrating an exemplary method for implementing a messaging protocol between the subsystems shown in FIG. 3.

FIG. 4 is a flow diagram illustrating an exemplary method 200 for implementing a messaging protocol between the subsystems of the vehicle communication system 100 shown in FIG. 3. Beginning at block 202, it is determined whether the impact warning system 104 has detected an imminent impact during a given sample period (e.g., 2 ms). If not, then method 200 exits or otherwise loops back until the next sample period. However, if an imminent impact is detected, then an affirmative signal (block 204) is sent to the telecommunication apparatus 102 through data bus 108. Upon receiving the affirmative signal 204, the telecommunication apparatus 102 sends a status query to the impact detection system controller 106 to determine whether the data bus 108 is operational and communication is maintained therebetween. In order to allow for the possibility of a "false alarm" (i.e., an incorrect indication of an imminent impact, sometimes common with impact warning systems), the vehicle communication system will first wait for a predetermined period of time before sending the query at block 206.

Once the query is sent, the telecommunication apparatus 102 waits for a response from the impact detection system controller 106, wherein there are three possible outcomes. First, if at decision block 208, a response is received, the response will convey information as to whether the impact detection system was engaged in reaction to an actual impact. This is further reflected by decision block 210. In the case where the impact detection system did not engage, method 200 proceeds to block 212 at which point the affirmative signal is deemed to be a "false alarm" from the perspective of the telecommunication apparatus 102, and no further action is taken to contact the service provider for notification purposes.

It should be pointed out that a "false alarm", as used in the present context, could mean just that (i.e., an incorrect determination by the impact warning system 104 that an impact is imminent). On the other hand, it could also be the case that the affirmative signal 204 was, in fact, reflective of an imminent impact, but the driver performed an evasive maneuver to avoid an impact in response to a warning provided by the impact warning system 104. In either case, there was no impact detection engagement and thus no impact.

If at decision block 210, the impact detection system controller indicates the impact detection system has been engaged, then the telecommunication apparatus 102 places a notification call to the service provider. This particular scenario is in accordance with existing communication systems, such as OnStar®, wherein a detected impact detection engagement results in a notification call being placed at block 214. However, the existing systems do not act in the case where, at decision block 208, no response is received by the telecommunication apparatus 102. If this occurs, it is presumed that the data bus 108 and/or impact detection system controller 106 has been damaged, indicative that an impact has occurred. Therefore, in this instance, the method would proceed to block 214, where a notification call is placed.

Figure 5:
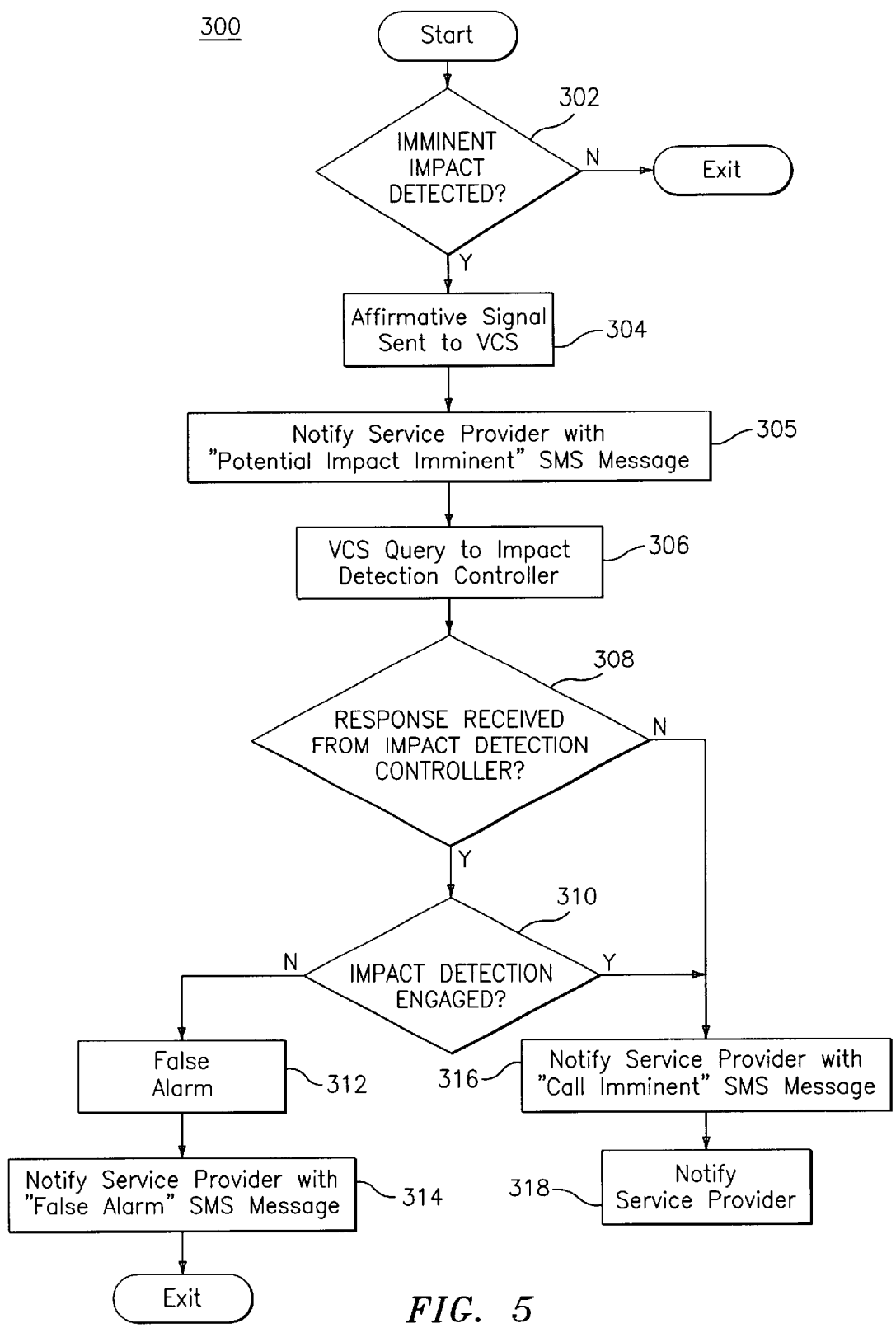
FIG. 5 is a flow diagram illustrating an alternative embodiment of the method shown in FIG. 4.

Finally, FIG. 5 is a flow diagram illustrating an alternative embodiment of the method illustrated in FIG. 4. In this embodiment, the method 300 (in addition to sending an affirmative signal to the VCS) further notifies the service provider with a "potential impact imminent" message through a Short Message Service (SMS) at block 305, upon the detection of an imminent impact. As with the case of the embodiment of FIG. 4, the VCS then sends a query to the impact detection controller (e.g., an airbag controller) to see whether communication is maintained therewith. Thus, if no response is received from the impact detection controller, then method 300 proceeds from decision block 308 to block 318, where the service provider is then notified. Optionally, method 300 may also first provide another SMS message to the service provider that a call is imminent from the vehicle, as shown in block 316.

However, if a response is received from the impact detection controller and there has not been an engagement of the impact detection system, then a "false alarm" condition will result in an SMS message to the service provider to that effect, as shown in block 314. But, if there has been an engagement of the impact detection system, then method 300 proceeds from decision block 310 to block 316 where the "call imminent" SMS message is sent before the actual call is placed by the VCS to the service provider.

This embodiment allows the service provider to be somewhat more proactive in that upon receiving the "impact imminent" message, it could set a timer for a certain duration to wait and see if it hears back from the vehicle. If the service provider does not hear from the vehicle after the set duration, then the provider will attempt to call the vehicle. If no contact is made upon attempting a call, then the service provider will assume an impact has occurred and take appropriate action. If contact is made, the service provider can directly verify the status of the occupant(s) of the vehicle to see if any further action is warranted.

Furthermore, if the VCS does respond to the service provider that a false alarm occurred, no further action by the service provider need take place. On the other hand, if the VCS responds to the service provider with a call imminent message, then the service provider can take proactive measures (as described above) after a certain duration of time where an actual call does not come from the vehicle following the call imminent message.

As will be appreciated from the foregoing description, the disclosed method and system embodiments serve to enhance the communication of a engaged impact detection condition to the service provider of a vehicle communication network, such as OnStar®. By integrating the vehicle communication system (VCS) 100 with a pre-impact or ACN system, the VCS is "flagged" whenever an imminent impact is detected.

While there are other possible implementations to accomplish this result partially, none provide all of the aspects as outlined above. For example, the impact detection system controller could periodically (without query) transmit a message indicating "engagement" or "no engagement", and when such transmissions completely disappear, then the VCS could initiate the notification to the service provider. However, there could be other causes for the loss of the communication from the impact detection system controller (e.g., malfunction of the impact detection system controller or the data bus due to non-impact related reasons).

Alternatively, the VCS could periodically query the impact detection system controller and, upon receiving no response, the VCS would initiate the notification. Again, such an alternative approach may result in incorrect notification if there is a failure in the vehicle data bus or the air bag controller. Furthermore, this technique would increase the traffic on the data bus unnecessarily.

As will also be appreciated, the disclosed invention can be embodied in the form of computer or controller implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The present invention may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An integrated vehicle communication system for a vehicle, comprising:
    a telecommunication apparatus in communication with a vehicle data bus; and
    a pre-impact system in communication with said vehicle data bus;
    said pre-impact system further providing said telecommunication apparatus with a signal reflective of a determined imminent impact detected thereby;
    wherein, upon receiving said signal reflective of said determined imminent impact, said telecommunication apparatus initiates a notification to a service provider if said telecommunication apparatus is not in communication with an impact detection system controller in the vehicle.

2. The vehicle communication system of claim 1, wherein said impact detection system controller is coupled to said vehicle data bus.

3. The vehicle communication system of claim 1, wherein said telecommunication apparatus, upon receiving said signal reflective of said determined imminent impact, sends a query to said impact detection system controller through said vehicle data bus.

4. The vehicle communication system of claim 3, wherein said query is determinative of communication between said telecommunication apparatus and said impact detection system controller and, if communication is maintained therebetween, said query is further determinative of an impact detection engagement status of an impact detection system within the vehicle.

5. The vehicle communication system of claim 4, wherein:
    if said query determines that said telecommunication apparatus is no longer in communication with said impact detection system controller, then said telecommunication apparatus initiates a notification to the service provider;
    if said query determines that said telecommunication apparatus is still in communication with said impact detection system controller, and said query determines that said impact detection system has been engaged, then said telecommunication apparatus initiates a notification to the service provider; and
    if said query determines that said telecommunication apparatus is still in communication with said impact detection system controller, and said query determines that said impact detection system has not been engaged, then said telecommunication apparatus does not initiate a notification to the service provider.

6. The vehicle communication system of claim 3, wherein said telecommunication apparatus, upon receiving said signal reflective of said determined imminent impact, further sends an imminent impact signal to the service provider.

7. The vehicle communication system of claim 5, wherein:
    if said query determines that said telecommunication apparatus is no longer in communication with said impact detection system controller, then said telecommunication apparatus sends a call imminent message to the service provider prior to initiating said notification to the service provider;
    if said query determines that said telecommunication apparatus is still in communication with said impact detection system controller, and said query determines that said impact detection system has been engaged, then said telecommunication apparatus sends a call imminent message to the service provider prior to initiating said notification to the service provider; and
    if said query determines that said telecommunication apparatus is still in communication with said impact detection system controller, and said query determines that said impact detection system has not been engaged, then said telecommunication apparatus sends a false alarm message to the service provider.

8. A vehicle communication network, comprising:
    a wireless telecommunication network;
    a public switched telephone network accessible by said wireless telecommunication network; and an integrated vehicle communication system configured within a vehicle, said vehicle communication system further comprising:
a telecommunication apparatus in communication with a vehicle data bus; and
a pre-impact system in communication with said vehicle data bus;
said pre-impact system further providing said telecommunication apparatus with a signal reflective of a determined imminent impact detected thereby;
wherein, upon receiving said signal reflective of said determined imminent impact, said telecommunication apparatus initiates a notification to a service provider connected to said public switched telephone network if said telecommunication apparatus is not in communication with an impact detection system controller in the vehicle.

9. The vehicle communication network of claim 8, wherein said impact detection system controller is coupled to said vehicle data bus.

10. The vehicle communication network of claim 8, wherein said telecommunication apparatus, upon receiving said signal reflective of said determined imminent impact, sends a query to said impact detection system controller through said vehicle data bus.

11. The vehicle communication network of claim 10, wherein said query is determinative of communication between said telecommunication apparatus and said impact detection system controller and, if communication is maintained therebetween, said query is further determinative of an impact detection engagement status of an impact detection system within the vehicle.

12. The vehicle communication network of claim 11, wherein:
if said query determines that said telecommunication apparatus is no longer in communication with said impact detection system controller, then said telecommunication apparatus initiates a notification to the service provider;
if said query determines that said telecommunication apparatus is still in communication with said impact detection system controller, and said query determines that said impact detection system has been engaged, then said telecommunication apparatus initiates a notification to the service provider; and
if said query determines that said telecommunication apparatus is still in communication with said impact detection system controller, and said query determines that said impact detection system has not been engaged, then said telecommunication apparatus does not initiate a notification to the service provider.

13. The vehicle communication network of claim 10, wherein said telecommunication apparatus, upon receiving said signal reflective of said determined imminent impact, further sends an imminent impact signal to the service provider.

14. The vehicle communication network of claim 12, wherein:
if said query determines that said telecommunication apparatus is no longer in communication with said impact detection system controller, then said telecommunication apparatus sends a call imminent message to the service provider prior to initiating said notification to the service provider;
if said query determines that said telecommunication apparatus is still in communication with said impact detection system controller, and said query determines that said impact detection system has been engaged, then said telecommunication apparatus sends a call imminent message to the service provider prior to initiating said notification to the service provider; and
if said query determines that said telecommunication apparatus is still in communication with said impact detection system controller, and said query determines that said impact detection system has not been engaged, then said telecommunication apparatus sends a false alarm message to the service provider.

15. A method for communicating an impact event of vehicle, the method comprising:
receiving an indication of an imminent impact from a vehicle pre-impact detection system; and
determining a communication status with an impact detection system controller within the vehicle;
wherein if it is determined that communication with said impact detection system controller is interrupted, then further initiating a communication to a service provider that an actual impact has occurred.

16. The method of claim 15, wherein if it is determined that communication with said impact detection system controller is not interrupted, then further determining an impact detection engagement status.

17. The method of claim 16, wherein if said impact detection engagement status indicates that a vehicle impact detection system has engaged, then further initiating a communication to a service provider that an actual impact has occurred.

18. The method of claim 15, wherein said indication of an imminent impact from a vehicle pre-impact detection system is received by a vehicle communication system, from said pre-impact detection system, over a vehicle data bus.

19. The method of claim 15, further comprising:
upon receiving an indication of an imminent impact, delaying for a predetermined period of time prior to sending a query to said impact detection system controller in order to determine a communication status thereof.

20. A storage medium, comprising:
a machine readable computer program code for communicating an impact event of vehicle; and
instructions for causing a computer to implement a method, the method further comprising:
receiving an indication of an imminent impact from a vehicle pre-impact detection system; and
determining a communication status with an impact detection system controller within the vehicle;
wherein if it is determined that communication with said impact detection system controller is interrupted, then further initiating a communication to a service provider that an actual impact has occurred.

* * * * *